(12) United States Patent
Boydston

(10) Patent No.: US 12,172,649 B1
(45) Date of Patent: Dec. 24, 2024

(54) GROUND PROFILE ESTIMATION FOR SENSOR DATA

(71) Applicant: Zoox, Inc., Foster City, CA (US)

(72) Inventor: Jacob Daniel Boydston, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 274 days.

(21) Appl. No.: 17/710,855

(22) Filed: Mar. 31, 2022

(51) Int. Cl.
*B60W 40/06* (2012.01)
*B60W 60/00* (2020.01)

(52) U.S. Cl.
CPC .......... *B60W 40/06* (2013.01); *B60W 60/001* (2020.02); *B60W 2552/15* (2020.02); *B60W 2554/4041* (2020.02)

(58) Field of Classification Search
CPC ............. B60W 40/06; B60W 60/001; B60W 2552/15; B60W 2554/4041
USPC ............................................................ 701/1
See application file for complete search history.

(56) References Cited

U.S. PATENT DOCUMENTS

| | | | |
|---|---|---|---|
| 2021/0096264 A1* | 4/2021 | Bosse | .................. G05D 1/0088 |
| 2021/0096566 A1 | 4/2021 | Wang et al. | |
| 2021/0172756 A1 | 6/2021 | Wheeler et al. | |
| 2021/0302582 A1 | 9/2021 | Liu et al. | |
| 2021/0319602 A1 | 10/2021 | Takahashi et al. | |
| 2022/0379917 A1* | 12/2022 | Henke | ............... B60W 60/0015 |

FOREIGN PATENT DOCUMENTS

JP     2014228300 A    12/2014

OTHER PUBLICATIONS

The PCT Search Report and Written Opinion mailed Jul. 19, 2023 for PCT application No. PCT/US23/16965, 11 pgs.

* cited by examiner

*Primary Examiner* — Scott A Reinbold
(74) *Attorney, Agent, or Firm* — Lee & Hayes, P.C.

(57) ABSTRACT

Inaccurate sensor data, such as by caused by reflections, may skew ground profile estimations that identify a profile or plane associated with a surface, such as a roadway. Correcting a ground profile that was based on inaccurate sensor data may include determining a location at which a slope of the ground profile meets or exceeds a maximum slope, determining a line associated with the location and having a slope of a magnitude equal to the maximum slope, and using the line to determine a subset of sensor data points that lies outside a region defined by the line. The subset of sensor data points that lies outside the region may be excluded from the set of sensor data points used to generate ground profile(s) and a new ground profile may be determined using the set of sensor data points, less the subset of sensor data points.

20 Claims, 6 Drawing Sheets

GROUND PROFILE ESTIMATION FOR SENSOR DATA

BACKGROUND

Safety of passengers in a vehicle and other people or objects in proximity to autonomous or semi-autonomous vehicle is of the upmost importance. Such safety is often predicated on an accurate detection of a potential collision and timely deployment of a safety measure. To safely operate, an autonomous vehicle may include multiple sensors and various systems for detecting and tracking events surrounding the autonomous vehicle and may take these events into account when controlling the autonomous vehicle. Different types of sensors have different weaknesses that may cause a sensor to become unavailable or unreliable (e.g., a camera in dense fog) or for the sensor data to become acutely inaccurate (including detection of multi-path reflections, for example). Such inaccuracy may cause an autonomous vehicle to fail to detect an object. For example, reflections of lidar beams from glass, some metal, and other materials may cause an aberration that may disturb an autonomous vehicle's ability to differentiate between an object and the ground, risking failing to properly detect an object.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1:
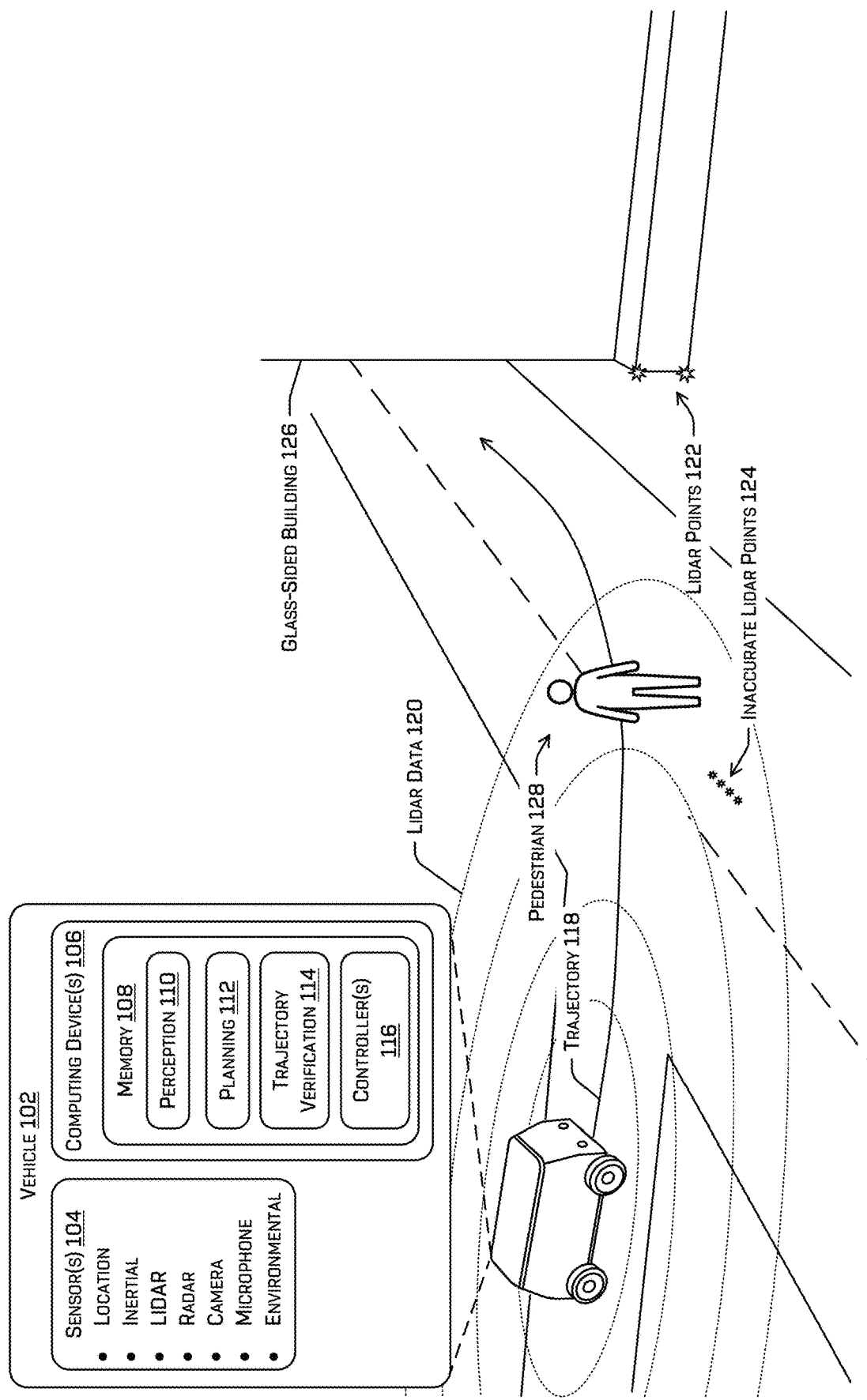
FIG. 1 illustrates an example scenario in which an autonomous vehicle may determine a ground profile to differentiate between sensor data points associated with the ground and sensor data points associated with an object in the presence of inaccurate sensor data points.

As discussed above, various types of materials may reflect sensor emissions differently, and some materials, such as glass or highly reflective metal surfaces, may reflect sensor emissions such that the sensor incorrectly identifies a point associated with the surface as being located in a very different position than the surface. For example, glass reflections of lidar beams may cause a lidar sensor to indicate that there is a return indicating a surface underground (e.g., as may be caused by a multi-path- or multiple reflections-lidar return where the sensor wrongly associated the distance from the device at a particular angle). A perception system may use the sensor data to determine a ground profile that indicates an estimate of where the ground is located. When the sensor data is inaccurate, this ground profile may be incorrect, which may result in the perception system being unable to differentiate between the ground and an object, such as a pedestrian or vehicle and/or otherwise yield unsafe scenarios when relying on such data for navigation. In an instance where the sensor data is inaccurate, an object may be incorrectly identified or failed to be identified and/or an autonomous vehicle may be unable to determine a trajectory for controlling the vehicle.

In some examples, the techniques discussed herein may be executed by a primary perception system and/or a trajectory verification component that validates, rejects, or replaces a trajectory generated to control a vehicle. The trajectory verification system discussed herein may comprise a secondary perception component and/or validation component. Discussions herein of a perception system that executes the operations discussed herein may therefore include the primary perception system or the secondary perception system. For example, the trajectory verification system may receive a trajectory from a planning component and receive, from one or more sensors, sensor data associated with an environment surrounding an autonomous vehicle. In some examples, while a primary perception component may determine perception data based at least in part on all or near all of the sensor data, the secondary perception component of the trajectory verification system may determine a corridor associated with the trajectory and conduct the operations discussed herein based at least in part on a subset of the sensor data associated with the corridor. Of course, the discussion herein is not meant to be so limiting. While use of a corridor may reduce the computational resources required to perform the actions described herein, use of all of the sensor data may be used with plane estimations to obtain better understanding of the scene as a whole. The trajectory verification system may determine the corridor based at least in part on a width and/or length of the vehicle, a current velocity of the vehicle and/or a velocity associated with the trajectory, a distance in front of the vehicle, and/or an offset distance. In at least some examples, such a secondary perception system may further use similar and/or dissimilar hardware and or software with respect to the primary system.

The secondary perception component may comprise an M-estimator, but may lack an object classifier such as, for example, a neural network, decision tree, and/or the like for classifying objects. In additional or alternate examples, the secondary perception system may comprise a machine-learned (ML) model of any type, configured to disambiguate classifications of objects. By contrast, the primary perception component may comprise a pipeline of hardware and/or software components, which may comprise one or more machine-learning models, Bayesian filters (e.g., Kalman filters), graphics processing unit(s) (GPU(s)), and/or the like. In some examples, the perception data may comprise object detections (e.g., identifications of sensor data associated with objects in an environment surrounding the autonomous vehicle), object classifications (e.g., identifications of an object type associated with detected objects), object tracks (e.g., historical, current, and/or predicted object position, velocity, acceleration, and/or heading), and/or the like.

In some examples, the secondary perception component may classify the subset of sensor data (associated with the corridor) as belonging to either a ground classification or an object classification. The ground classification may identify sensor data as being associated with a roadway and/or other environmental surface, whereas the object classification may comprise any other object that is not ground. In some examples, the techniques discussed herein may simply classify sensor data as either ground or an object, without further identifying what type of object. The trajectory verification system may use these classifications to determine whether a trajectory is valid by determining whether the trajectory will cause the autonomous vehicle to occupy a position identified by the classification as being associated with an object, as opposed to ground, for example. In some examples, determining that sensor data is associated with the object classification may include determining a ground profile and classifying, as an object, sensor data having an elevation greater than elevation(s) identified by the nearest portion(s) of the ground profile.

In some examples, the techniques may comprise ground estimation techniques that may improve (e.g., decrease) a false negative and/or false positive rate associated with classifying sensor data as ground or as an object. In some examples, the techniques may comprise estimating a line and/or plane to model a profile of a roadway surface (e.g., a roadway height profile), particularly for complex roadways that may comprise one or more changes in grade (e.g., slope of the roadway surface), although the ground profile may additionally or alternatively include flat roadway surfaces. These ground fitting techniques may comprise determining a spline (e.g., one or more polynomials, a Bezier curve, B-spline) associated with the ground based at least in part on determining a number of control points and knots of the spline based at least in part on a number or percentage of sensor data that comprises a valid return. The techniques may additionally or alternatively comprise weighting the sensor data before generating the spline (e.g., by weighting a least-squares regression towards a lowest and/or highest (in elevation) sensor data point), altering a height value (e.g., ordinate) associated with one or more control points based at least in part on sensor data as a post-fitting operation, and/or altering a spacing of the knots as a post-fitting operation. In some examples, determining the spline may comprise determining values of the control points and/or knots based at least in part on a regression algorithm (e.g., least squares). In an example where the line is a spline, the spline may be a B-spline having a number of knots defined by a number of channels associated with the sensor data. See U.S. patent application Ser. No. 16/588,717, filed Sep. 30, 2019, the entirety of which is incorporated by reference herein, for additional details regarding ground profile generation.

Regardless of how the ground profile is generated by the perception system, after a ground profile has been generated, the perception system may correct the ground profile to account for inaccurate sensor data, such as inaccurate sensor data caused by reflections from highly reflective objects, such as chrome bumpers, glass, reflective trailers, etc. The perception system may include hardware (e.g., application-specific integrated circuit (ASIC), field-programmable gate array (FPGA)) and/or software (e.g., such as may be implemented on an FPGA, central processing unit (CPU), graphics processing unit (GPU), microcontroller, or the like) for validating and correcting the ground profile. Validating and/or correcting the ground profile may include determining a slope associated with the ground profile and determining whether there are any locations along the ground profile where the slope meets or exceeds a maximum slope.

The maximum slope may be defined by a global maximum slope (e.g., the steepest road in the world), a regional maximum slope, or a local maximum slope. For example, the maximum slope may be statically set in the case of the global maximum slope at about 40 degrees. In additional or alternate examples, the maximum slope may be determined based at least in part on a location of the vehicle. For example, the vehicle may determine, based at least in part on sensor data (e.g., global positioning system (GPS); lidar, radar, image, and/or the like data used in simultaneous localization and mapping (SLAM) to locate the vehicle), a location of the vehicle and may query a database (e.g., a map) for the slope of the steepest roadway within a specified range of the location (e.g., in the same state as the vehicle, within n miles or feet of the vehicle (where n is a positive integer), in a same city as the vehicle, in a same city region as the vehicle).

If the ground profile doesn't include any portion that has a slope that meets or exceeds the maximum slope, the perception system (which may be the secondary perception system) may identify the ground profile as being validated and may use the ground profile for any of a variety of tasks, such as for use in a secondary perception system that determines whether a trajectory is valid. Additionally or alternatively, this validation may be limited to determining that such slope bounds are met within a specified distance of the vehicle. However, if the perception system determines that a portion of the ground profile is associated with a slope that meets or exceeds the maximum slope, the perception system may execute the following ground profile correction techniques until an end condition is reached. In some examples, the end condition may be a number of iterations of corrections, a distance from the vehicle, a length associated with the trajectory, a number of inliers and/or outliers (to determine whether the ground profile determination is converging/stabilizing), or the like. In some examples, the perception system may search from a position of the vehicle for a closest location that is associated with a slope that meets or exceeds the maximum slope (e.g., as may be computed on a per point basis using any form of finite difference method, for example).

The correction techniques may include determining a line associated with the location at which the slope was determined to meet or exceeds the maximum slope. The line may have a slope that equals the maximum slope and that passes through or originates at the location. In some examples, two lines may be generated-one with a positive slope and one with a negative slope. The positive and negative slopes may have a same absolute magnitude or, in another example, the positive slope may be a maximum positive slope and the negative slope may be a maximum (magnitude) negative slope, i.e., a minimum slope. In some examples, the techniques may include determining preliminary line(s) that pass through or originate from the location and adjusting the line(s) by a vertical offset. Where a single line is determined, if the slope is negative, the line vertical offset may be negative; or, if the slope is positive, the vertical offset may be positive causing the line to be adjusted upwards. Where two lines are determined, a negative vertical offset may be applied to the line having a negative slope, adjusting the negatively sloped line downwards; and a positive vertical offset may be applied to the line having a positive slope, adjusting the positively sloped line upwards.

The perception system may use the line(s) to determine sensor data point(s) to exclude from generating a new ground profile. The first ground profile may have been generated based at least in part on a first subset of sensor data and the new ground profile may be generated based at least in part on a second subset of sensor data. To determine this new subset of sensor data, the perception system may determine a second subset of sensor data points by determining sensor data points that lie below a negatively sloped line and/or sensor data points that lie above a positively sloped line and excluding such sensor data points. These sensor data point(s) that lie above and/or below the line(s) (depending on whether there is one line or two lines) may be excluded from the first subset of sensor data, thereby forming the new subset of sensor data. The new subset of sensor data may be used to generate the new ground profile. In some examples, excluding the first subset of sensor data may include masking or down-weighting the sensor data point(s) that lie above and/or below the line(s). Down-weighting may be used in examples where the ground profile estimation technique includes assigning a weight to sensor data points as part of the line or plane fitting.

The techniques may additionally or alternatively comprise determining a threshold distance based at least in part on a velocity associated with a trajectory generated by a planning component of the autonomous vehicle. For example, the threshold distance may be a stopping distance estimate associated with the vehicle at the current speed of the vehicle and/or at the velocity specified by the trajectory, given the environmental conditions (e.g., gradient, static coefficient of friction associated with roadway and/or roadway condition). A validation component of the trajectory verification system may determine whether any sensor data classified as an object (using the ground profile) is at a distance from the vehicle that is less than the threshold distance or whether a furthest point classified as ground is less than the threshold distance. In either case, the validation component may cause the vehicle to execute an alternate maneuver and/or to re-determine a trajectory based at least in part on determining that an object or the furthest detected ground is within the threshold distance of the vehicle. If the validation component determines that the nearest object is at a distance beyond the threshold distance and the furthest sensor data classified as ground is at a distance beyond the threshold distance, the validation component may validate the trajectory, which may comprise transmitting the trajectory to system controller(s) that may generate signals for actuating drive components of the vehicle to track the trajectory.

Additionally or alternatively, the validation component may determine whether to validate the trajectory or initiate an alternate maneuver based at least in part on a current velocity of the vehicle, a velocity associated with the trajectory, a velocity associated with an object, a current pose of the vehicle, and/or determining whether the sensor data associated with the object and/or ground classification is valid. For example, the techniques may comprise determining whether a current velocity, steering angle, steering rate, and/or heading of the vehicle comports (is within a respective threshold) with a velocity, steering angle, steering rate, and/or heading indicated by the trajectory.

For example, upon validating a trajectory according to the techniques discussed herein, the trajectory verification system may pass or otherwise allow the trajectory to be implemented by the vehicle. However, upon determining that the trajectory is invalid, according to the techniques discussed herein, the trajectory verification system may cause the vehicle to initiate a contingent trajectory (e.g., a safe stop maneuver, an alternate maneuver) and/or re-determine a new trajectory. In some examples, a planning component of the vehicle may determine the trajectory based at least in part on sensor data, map data, localization data (e.g., where the autonomous vehicle is/how the autonomous vehicle is oriented relative to objects in the environment, mapped locations, and/or the like), and/or perception data (e.g., what is in the environment, characteristics of objects in the environment) received from a primary perception component.

The techniques discussed herein may improve the safety of a vehicle by correcting potentially aberrant data that may cause invalid presumptions about the safety of a scenario associated with an autonomous vehicle navigating a trajectory. Moreover, the techniques may reduce the amount of computational bandwidth, memory, and/or power consumed for collision avoidance in comparison to former techniques. The accuracy of the trajectory verification system may also be higher than an accuracy of the primary perception system, thereby reducing an overall error rate of trajectories implemented by the autonomous vehicle by filtering out invalid trajectories. Moreover, the techniques discussed herein may increase the accuracy of either system in the presence of sensor data errors, which may prevent unnecessary braking by the vehicle, aberrant steering, and/or reducing requests transmitted by the vehicle to receive remote assistance, which may reduce network usage by the vehicle and downtime experienced by the vehicle while the vehicle waits for remote assistance.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like. In some examples, vehicle 102 may be represented in a simulation as a simulated vehicle. For simplicity, the discussion herein does not distinguish between a simulated vehicle and a real-world vehicle. References to a "vehicle" may therefore reference a simulated and/or a real-world vehicle.

According to the techniques discussed herein, the vehicle 102 may receive sensor data from sensor(s) 104 of the vehicle 102. For example, the sensor(s) 104 may include a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, a trajectory verification component 114, and/or system controller(s) 116. Although depicted in FIG. 1 for illustrative purposes, it is understood that the trajectory verification component 114 may reside in/on a separate computing device (or otherwise) than any one or more of the other components. In some examples, the perception component 110 may be a primary perception component among other perception components, such as a secondary perception component that may be part of trajectory verification component 114. In general, the perception component 110 may determine what is in the environment surrounding the vehicle 102 and the planning component 112 may determine how to operate the vehicle 102 according to information received from the perception component 110. For example, the planning component 112 may determine trajectory 118 based at least in part on the perception data and/or other information such as, for example, one or more maps, localization information (e.g., where the vehicle 102 is in the environment relative to a map and/or features detected by the perception component 110), and/or the like. The trajectory 118 may comprise instructions for controller(s) 116 to actuate drive components of the vehicle 102 to effectuate a steering angle and/or steering rate, which may result in a vehicle position, vehicle velocity, and/or vehicle acceleration. For example, the trajectory 118 may comprise a target heading, target steering angle, target steering rate, target position, target velocity, and/or target acceleration for the controller(s) 116 to track. In some examples, the trajectory 118 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters). The perception component 110 and/or the planning component 112 may include one or more machine-learned (ML) models and/or other computer-executable instructions.

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), local map data that identifies characteristics detected in proximity to the vehicle (e.g., locations and/or dimensions of buildings, trees, fences, fire hydrants, stop signs, and any other feature detectable in various sensor modalities), etc. The object classifications determined by the perception component 110 may distinguish between different object types such as, for example, a passenger vehicle, a pedestrian, a bicyclist, a delivery truck, a semi-truck, traffic signage, and/or the like. A track may comprise a historical, current, and/or predicted object position, velocity, acceleration, and/or heading. The data produced by the perception component 110 may be collectively referred to as perception data. Once the perception component 110 has generated perception data, the perception component 110 may provide the perception data to the planning component 112.

The planning component 112 may use the perception data received from perception component 110, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 118 of the vehicle 102 that may be used to generate a drive control signal that may be transmitted to drive components of the vehicle 102. FIG. 1 depicts an example of such a trajectory 118, represented as an arrow indicating a heading, velocity, and/or acceleration, although the trajectory itself may comprise instructions for controller(s) 116, which may, in turn, actuate a drive system of the vehicle 102.

In some examples, the perception component 110 may comprise a pipeline of hardware and/or software, which may include one or more GPU(s), ML model(s), Kalman filter(s), and/or the like. In some examples, the perception component 110 may monitor as much of the environment surrounding the autonomous vehicle as possible, which may be limited by sensor capabilities, object and/or environmental occlusions (e.g., buildings, grade changes, objects in front of other objects), and/or environmental effects such as fog, snow, and/or the like. For example, the sensor data may comprise LIDAR and/or radar data, which the perception component 110 may receive as input. The perception component 110 may be configured to detect as many objects and information about the environment as possible to avoid failing to account for an event or object behavior that should be taken into account by the planning component 112 in determining the trajectory 118.

By contrast, the trajectory verification component 114 may monitor a corridor (depicted in FIG. 4) associated with the trajectory 118. For example, the trajectory verification component 114 may receive the trajectory 118 from the planning component 112 and determine the corridor based at least in part on the trajectory. Determining the corridor may comprise determining a region of the environment based at least in part on a current velocity of the vehicle 102, a velocity specified by the trajectory 118, a distance in front of the vehicle, a width of the vehicle, and/or an offset that may be based at least in part on steering rack actuator gains, vehicle kinematics such as tire slippage, body roll, etc., and/or the like. In at least some examples, such a corridor may additionally, or alternatively, represent a simplistic geometric region relative to the vehicle. The trajectory verification component 114 may determine a first subset of the sensor data associated with the corridor and conduct the operations discussed herein based at least in part on the first subset. For example, in the example scenario, the trajectory verification component 114 may determine a first subset that comprises sensor data that includes the portion of the environment indicated by corridor. The trajectory verification component 114 may monitor sensor data associated with the corridor to ensure the trajectory 118 will not or is not likely to result in a collision.

In some examples, the trajectory verification component 114 may conduct the techniques discussed herein that may comprise determining a ground profile associated with the first subset of sensor data associated with the corridor. As discussed further herein, the ground profile may be a line, such as a curve, or a plane that the trajectory verification component 114 fits to the first subset of sensor data. In some examples, the trajectory verification component 114 may reduce a dimensionality of the first subset of sensor data to determine the ground profile, such as in instances where the ground profile is a line. For example, the trajectory verification component 114 may project the first subset of sensor data into a space defined by the trajectory (e.g., a space that references an arc length of the trajectory) without accounting for lateral offset from the trajectory. In other words, the elevations indicated by the first subset of sensor data may be taken into consideration. In an additional or alternate example, the trajectory verification component 114 may determine a plane associated with the first subset of sensor data.

In some examples, the trajectory verification component 114 may determine a slope of the ground profile that meets or exceeds a threshold slope (e.g., by finite difference, numerical derivatives, or analytical derivatives for those curves fit to the data). Such a slope may be caused by inaccurate sensor data. FIG. 1 includes a depiction of such data. For example, the vehicle 102 may receive sensor data that includes lidar data 120. The lidar data may include true positive lidar points 122 and inaccurate lidar points 124 that appear to be underground. In the depicted example, the inaccurate lidar points 124 may be caused by a glass-sided building 126 (which would cause a specular reflection, ultimately wrongly associating the lidar return with the distance to some other object). Although the example discusses lidar data, it is understood that other sensors may similarly encounter situations such as the depicted scenario where the sensor data is inaccurate due to reflections (e.g., radars, ultrasonics, stereo cameras). The inaccurate lidar points 124 may cause the ground profile to be skewed downward (underground in this case, although other cases may cause the ground profile to be skewed upward). In the depicted instance, a pedestrian 128 may be inaccurately classified as a tree or overhead object like a light pole instead of being classified as an object to be avoided, causing a safety-critical problem. The techniques discussed herein rectify the ground profile by determining a second subset of sensor data that excludes the inaccurate lidar points 124 according to the operations discussed herein.

The trajectory verification component 114 may comprise a secondary perception component that may classify the subset of sensor data into one of two classifications: ground or object. In some examples, there may be more classifications (e.g., different object classifications). The trajectory verification component 114 may additionally or alternatively comprise a validation component that may determine the threshold distance discussed herein and/or determine whether to validate or reject the trajectory 118. Validating the trajectory 118 may comprise transmitting the trajectory 118 to the controller(s) 116 (e.g., the validation component may comprise a multiplexer, one or more transistors configured as a switch that passes the trajectory 118 upon receiving a signal from the validation component, a publish-subscribe network where the validation component transmits the and/or the like that may provide a signal that allows the trajectory 118 signal to pass to the controller(s) 116). Rejecting the trajectory 118 may comprise transmitting a message to the planning component 112 to initiate re-determining a trajectory and/or initiating an alternate maneuver, such as a safe stop maneuver (e.g., emergency braking, pull over and park) and/or a contingent trajectory that may be received from the planning component 112 in addition to the trajectory 118 and/or stored in the memory 108. In some examples, the trajectory verification component 114 may determine that at least a portion of the subset of the sensor data is valid or invalid based at least in part on an orientation of the sensors and/or a topology of the environment and/or a lower and upper bound of a valid portion of the sensor data, as discussed in more detail herein.

In some examples, the controller(s) 116 may comprise software and/or hardware for actuating drive components of the vehicle 102 sufficient to track the trajectory 118. For example, the controller(s) 116 may comprise one or more proportional-integral-derivative (PID) controllers.

Figure 2:
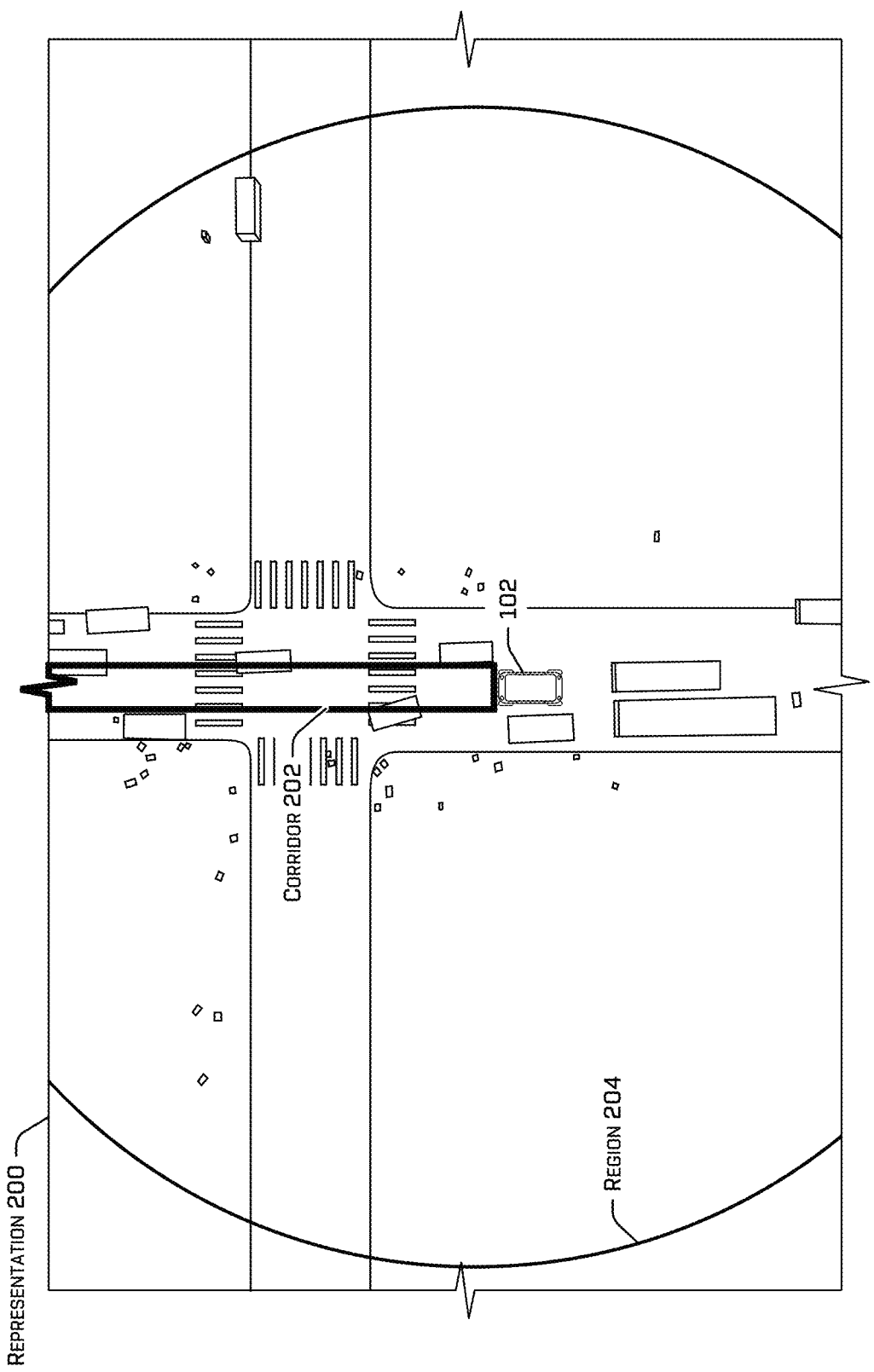
FIG. 2 illustrates a top-down view of an example scenario and a corridor monitored by the trajectory verification component compared to an additional or alternative trajectory verification system monitoring region.

FIG. 2 illustrates a top-down view of a sensor data representation 200 of an example scenario and the corridor 202 monitored by the trajectory verification component compared to an additional or alternative trajectory verification system monitoring region 204. Sensor data within region 204, represented as a circle, may be monitored by an additional or alternative trajectory verification system. In an additional or alternate example, region 204 may identify a distance from the vehicle 102 monitored by the (primary) perception component 110. In such an example, the region 204 may correspond to a maximal effective range of one or more of the sensor(s) 104.

Note that, in the depicted example, the trajectory is straight; therefore, the corridor 202 is correspondingly straight. It is noted that the corridor 202 shape may be based at least in part on a shape of the trajectory 118 and may be curved, not uniform, and/or not straight, in accordance with the trajectory 118 and/or a topology of the environment. In some examples, the corridor 202 may be two or three or more-dimensional.

Figure 3:
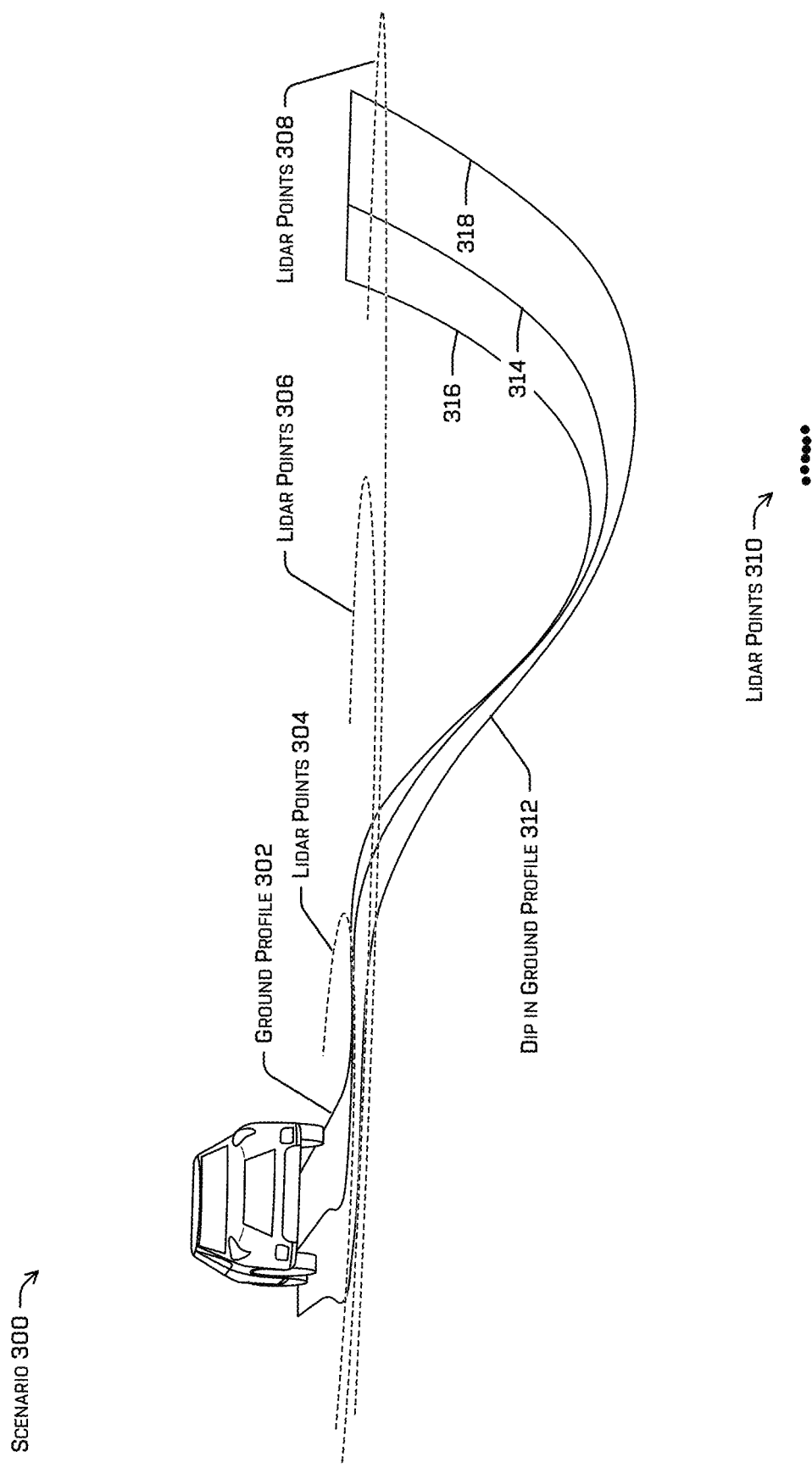
FIG. 3 illustrates example sensor data that includes inaccurate sensor data and a resultant inaccurate ground profile.

FIG. 3 illustrates example lidar data that includes inaccurate lidar data and a resultant inaccurate ground profile for a scenario 300 that may correspond with example scenario 100. A perception component of the vehicle 102 may determine the inaccurate ground profile, i.e., ground profile 302, based at least in part on lidar data that includes lidar points 304, 306, 308, and 310. Lidar points 310 may be inaccurate and may be caused by a reflection, in at least one example. The inaccurate lidar points 310 may skew the ground profile 302, resulting in a dip in the ground profile 312, which inaccurately represents where the drivable surface is located and which may result in incorrectly classifying objects at or near the dip in the ground profile 312. Note that ground profile 302 may be the line 314 in the middle of the plane in which case the outer lines 316 and 318 may be a depiction of the lateral extents of a corridor. Additionally or alternatively, the ground profile 302 may be the plane itself and line 314 may be a depiction of a superimposition of the trajectory 118 onto the ground profile 302.

Example Process

Figure 4:
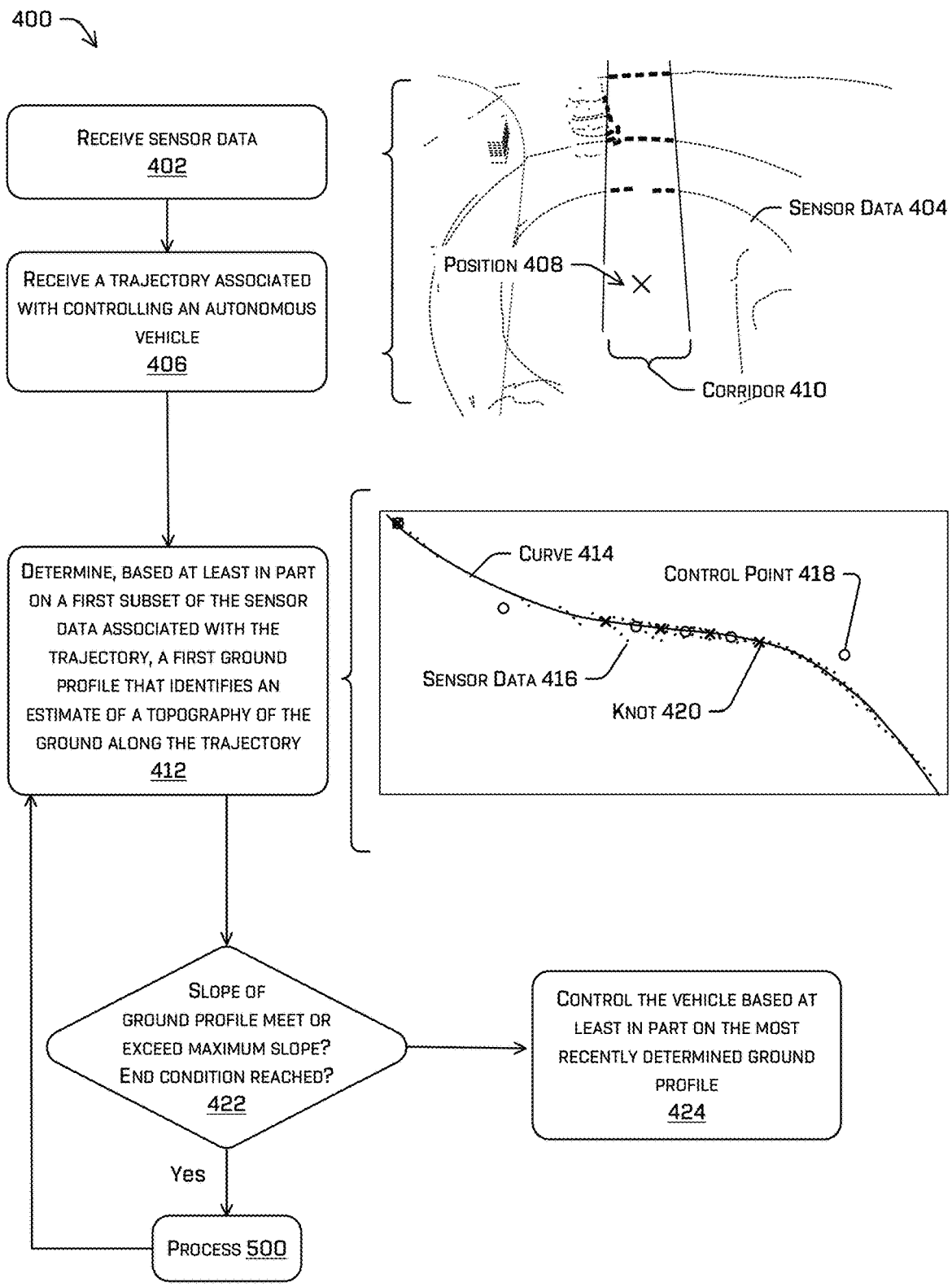
FIG. 4 illustrates a pictorial flow diagram of an example process for correcting an inaccurate ground profile.

FIG. 4 illustrates a pictorial flow diagram of an example process 400 for determining a ground profile based at least in part on sensor data received at a vehicle. The example process 400 further includes validating and/or correcting the ground profile. The vehicle does not need prior knowledge that there is inaccurate sensor data present or that the ground profile is skewed to correct a ground profile. In some examples, example process 400 may be conducted iteratively, as discussed further herein. In some examples, example process 400 may be conducted by a primary perception system of the vehicle. In an additional or alternate example, example process 400 may be executed by a secondary perception system of the vehicle, such as a perception component of a trajectory verification component or other systems that rely on a high accuracy ground profile.

At operation 402, example process 400 may comprise receiving sensor data from a sensor associated with the autonomous vehicle, according to any of the techniques discussed herein. For example, the sensor data 404 may comprise LIDAR and/or radar data, among other types of sensor data. The techniques may be used for a variety of sensor data types and may not be limited to light-based sensors. In some examples, the sensor data may comprise depth data (e.g., data indicating a distance from the sensor/autonomous vehicle to a surface in the environment), Doppler data associated with detected surfaces, and/or any other type of sensor data that indicates the position of objects in the environment surrounding the autonomous vehicle.

At operation 406, example process 400 may comprise receiving a trajectory from a planning component of the vehicle. For example, the trajectory may be a trajectory that will be implemented by the vehicle unless it is rejected by a trajectory verification component of the vehicle. In some examples, at operation 406, the trajectory may be simplified to a set of waypoints, i.e., discrete locations, through which the vehicle is to travel. The discussion herein may use one or more waypoints (locations within an environment) instead of or in addition to a path or trajectory, as discussed herein, although a trajectory is referenced for simplicity. The disclosure is not intended to limit the disclosure to a trajectory alone, but may use waypoint(s) and/or path in addition or alternatively. In some examples, determining the waypoints based at least in part on the trajectory may include determining the waypoints based at least in part on a set of controls associated with the trajectory for controlling motion of the vehicle. In yet another example, the set of waypoint(s) may be received from a first system without needing to determine the waypoint(s) from a trajectory or set of trajectories.

For example, the trajectory may identify a rate of steering, acceleration, and/or the like for controlling motion of the vehicle. The trajectory is unillustrated to increase clarity of the diagram. In some examples, the trajectory may comprise a current and/or planned position and/or velocity of the autonomous vehicle. In some examples, the perception system (whether it's the primary or a secondary perception system) may additionally or alternatively receive a current pose (i.e., position and/or orientation) of the vehicle, such as position 408. For example, the current pose may be received from a localization component and the trajectory may be received from a planning component and/or one or more sensors of the autonomous vehicle (e.g., wheel encoders, GPS). Of course, in other examples, 2- or 3-dimensional waypoints, lines, curves, polygons, surfaces, or otherwise may be used to represent the path (or portion thereof) the vehicle plans to travel.

In an additional or alternate example, the vehicle may additionally or alternatively receive a path that the vehicle has planned to travel from an origination point to a termination point. For example, the path may define a lane or portion of a roadway that the vehicle plans to occupy from the origination point to the termination point. The origination point may be an original point from which the vehicle started travelling or a current position and/or pose of the vehicle and the termination point may be an intermediate point on a route (e.g., an end of a block; a set number of meters; a location associated with a next operation, such as executing a turn, or merging onto a highway) or a final destination for the route. The route may be define the overarching plan to accomplish a mission, such as the sequence of maneuvers and roadways the vehicle is to complete to navigate from a starting position to a final destination.

In examples where the ground profile is limited to a region associated with the trajectory, the perception system may determine a corridor 410 associated with the trajectory (and/or waypoints and/or path). In some examples, determining the corridor may be based at least in part on the trajectory, a width and/or length of the autonomous vehicle, a distance in the direction of travel of the vehicle, a current velocity, and/or an offset. In at least some examples, such corridor dimensions may be based on, for example, parameters associated with the vehicle. As a non-limiting example, the length of the corridor may be a function of the velocity of the vehicle, whereas the width, as another example, may be based on a turning radius of the vehicle, likely speeds associated with objects in the vicinity of the vehicle, and the like.

At operation 412, example process 400 may comprise determining a first subset of the sensor data associated with the corridor (in examples where the ground profile is determined in a limited region) and determining, based at least in part on the first subset, a first ground profile that identifies an estimate of a topography of the ground along the trajectory, according to any of the techniques discussed herein. FIG. 4 depicts corridor 410, sensor data outside the corridor 410 as gray, and the first subset of sensor data within the corridor 410 as black. It is understood that the operations discussed herein may be applied to all of the sensor data or a different subset of sensor data, such as a subset of sensor data associated with a target region that the vehicle is planning to move into.

In an example where example process 400 is applied iteratively, the ground profile determined at operation 412 may be an n-th ground profile associated with an n-th iteration of the example process 400. In such an example, the subset of sensor data used to generate the n-th ground profile may be an n-th subset of sensor data. The first subset of sensor data associated with the first iteration may be an initial subset of sensor data determined based at least in part on the corridor 410, whereas the second and following subsets of sensor data may be the subset of sensor data associated with the corridor with some sensor data removed according to example process 500 described with reference to FIG. 5.

For the sake of simplicity, the following discussion regarding determining a ground profile assumes that the ground profile has been chosen to be a curve (e.g., instead of a plane or a series of linear lines). It is understood that the discussion herein may be extended to planes, etc. Determining the ground profile may include determining a curve 414 based at least in part on the subset of sensor data, illustrated as dots, such as sensor data 416. The curve or plane may include a polynomial and/or spline, such as a Bezier curve, B-spline, non-uniform rational B-spline (NURBS), and/or the like. In an example where the ground profile is determined by determining a spline, the vehicle may determine knots and control points to fit the curve to the sensor data 416. For example, FIG. 4 depicts control points as "o" marks, such as control point 418, and knots as "x" marks, such as knot 420.

A knot may define a terminus of a span of the curve. The span of the curve may be defined by a polynomial (or other curve function), the parameters of which may be defined by one or more control points. In some examples, the number of control points may be determined to be less than a number of channels of a sensor that include valid sensor data and the number of knots may be determined based at least in part on the number of control points and a curve degree (e.g., which may be set to equal the number of control points or, in additional or alternate examples, may be three or more). In some examples, the number of knots may equal the number of control points plus the curve degree plus one.

Operation 412 may additionally or alternatively comprise a fitting algorithm that minimizes a total residual associated with differences (errors) between individual sensor data points and the curve 414. The fitting algorithm may determine values of the control point vector and/or knot vector, which may define locations of control point(s) and/or knot(s). The control points and knots may define a spline or other curve. In some examples, the fitting algorithm may comprise a least-squares regression to fit an estimated curve, defined by the control points and knots, to the sensor data. In some examples, the fitting algorithm may be a weighted algorithm, such as weighted least squares (e.g., using the weights determined in association with the sensor data based at least in part on the elevations defined by the sensor data), although any other suitable fitting algorithm may be used, such as any of a variety of nonlinear least squares algorithms, such as the Gauss-Newton algorithm, and/or the like. Additional details are discussed in U.S. patent application Ser. No. 16/588,717, filed Sep. 30, 2019, the entirety of which is incorporated by reference herein. In some examples, a weight associated with a sensor data point may be determined based at least in part on an elevation indicated by the sensor data point. The lower the elevation indicated the sensor data point, the more likely the sensor data point may be associated with ground and therefore may have a greater weight associated therewith.

Functionally, the fitting of the curve at operation 412 may comprise altering the curve, control points, and/or knots based at least in part on the portion of sensor data and/or a ruleset, according to any of the techniques discussed herein. The ruleset may be generated based at least in part on the portion of the sensor data and may specify maximum elevation values of the control points based at least in part on elevation values of the sensor data (e.g., a control point may not have an elevation that exceeds a maximum elevation value of the sensor data) and/or a knot spacing technique. For example, the knot spacing technique may comprise determining a spacing (e.g., a distance) between knots and altering the spacing therebetween so that the knots are evenly spaced over an arc length or other distance. Some fitting algorithms may space the knots based at least in part on an index numbers of the sensor data (e.g., such that the knots are evenly distributed across the index numbers), but this may cause some knots to be overly distant or close to each other spatially.

Note that, at least for the depicted example, the curve 414 was generated for three-dimensional sensor data projected into a two-dimensional coordinate frame, representing elevation on a vertical axis and points along a longitudinal component of the trajectory along the horizontal axis. The curve may be determined in the two-dimensional space and projected back into the three-dimensional space associated with the original sensor data in order to determine whether sensor data is associated with a ground classification (e.g., sensor data that has an elevation less than or equal to the curve) or an object classification (e.g., sensor data that has an elevation above the curve). Such a determination may comprise translating the curve across the corridor to iteratively determine whether sensor data associated with a portion of the corridor is ground or an object. Additionally or alternatively, a plane may be fit to three-dimensional data instead of or in addition to a curve being fit to two-dimensional sensor data.

In some examples, determining the ground profile may include determining an initial segment of the ground profile. Initialization of the ground profile may increase the accuracy of the resultant ground profile. The initial segment may include a first portion of the ground profile, from which the remaining portion of the ground segment may be determined. This initial segment may be included in the fitting discussed above, even though it may not necessarily include sensor data. The initial segment may be weighted more heavily than sensor data, in some examples, although in additional or alternate examples, the initial segment may be given equal weight. Determining the initial segment may include determining a previous path or trajectory associated with previous operation of the autonomous vehicle (e.g., the previously implemented trajectory may be used as the initial segment), determining a position and orientation of one or more axles of the autonomous vehicle and determining a plane associated therewith that may be used to determine the initial segment, and/or determining a nearest location to the autonomous vehicle along the ground profile in a direction defined by the trajectory that is associated with a slope that is less than or equal to a maximum slope.

At operation 422, example process 400 may comprise determining whether a slope at a point on the ground profile meets or exceeds a maximum slope, according to any of the techniques discussed herein. Operation 422 may be conducted for an absolute value of the slope—i.e., an absolute value of a negative slope or an absolute value of a positive slope may exceed maximum slope or a positive maximum slope. In some examples, operation 422 may comprise determining slopes at points along the ground profile starting from a point on the ground profile closest to the vehicle and continuing to determine slopes along the ground profile until a slope is determined that meets or exceeds the maximum slope or a maximum arc length or distance along the trajectory is reached. Determining a slope may include determining a derivative associated with the ground profile at a point along the ground profile associated with a point on the trajectory. In some examples, this slope may have already been determined as part of determining a spline, such according to determining a NURBS.

In some examples, the maximum slope may be a static number stored in memory associated with a global maximum slope of a roadway (e.g., the slope of the steepest roadway in the world, 37.45 degrees, 40 degrees), a regional maximum slope of a roadway (e.g., a steepest slope in the country, county, or city in which the vehicle is operating), etc. In an additional or alternate example, the vehicle may determine, using sensor data, a location of the vehicle and may transmit a request to a server for the slope of the steepest nearest to the vehicle location within a set distance of the vehicle. The server may provide this slope and this slope may be used as the maximum slope. In some examples, the maximum slope may comprise a negative maximum slope and a positive maximum slope that may be different than each other, such as in an instance where a regional maximum slope is associated with a one-way street, in which case the vehicle should only use such a roadway in one direction.

If a slope is determined that meets or exceeds the maximum slope, example process 400 may continue to example process 500, which is discussed in more detail with reference to FIG. 5. After example process 500 is completed, example process 400 may return to operation 412, at which point a new ground profile may be determined using the new sensor data subset determined according to process 500. This process (operations 412 and 422 and process 500) may be iterated until an end condition, such as reaching a set number of iterations, reaching a point associated with an end of the trajectory, reaching a distance along the trajectory, determining that the ground profile does not include any slopes that meet or exceed the maximum slope, determining no change in the size of the set between iterations, or the like.

If the vehicle does not determine that a slope along the ground profile meets or exceeds the maximum slope or if the end condition is reached, example process 400 may transition to operation 424.

At operation 424, example process 400 may comprise controlling the vehicle based at least in part on the most recently determined ground profile. The most recently determined ground profile may be the ground profile determined at operation 412 after a most recent iteration of operations 412 and 422 and process 500. Controlling the vehicle based at least in part on such a ground profile may include classifying sensor data as being associated with a ground classification or an object classification using the ground profile and validating or rejecting the trajectory. For example, sensor data within a threshold distance of the ground profile may be associated with the ground classification and other sensor data that doesn't meet this criteria and has an elevation greater than the ground profile may be classified as being associated with an object. In some examples, the threshold distance may include a static distance (e.g., 1 centimeter, 0.5 centimeters) and/or a distance that is set based at least in part on a confidence or residual error associated with the ground profile. For example, residual error(s) determined as part of fitting the ground profile to the sensor data may be used to determine the threshold distance. In such an example, the threshold distance may be capped at a maximum distance, such as 1 centimeter, 5 centimeters, or the like to avoid false negative detections of small objects.

Operation 424 may include determining a position and/or velocity associated with at least a closest object to the vehicle. For example, operation 422 may comprise determining a velocity of an object based at least in part on accumulating sensor data associated with the object over time. In an additional or alternate example, determining the velocity of the object may be based at least in part on a doppler value indicated by a radar device, sonar device, and/or the like. In some examples, operation 422 may comprise determining a position and/or velocity associated with additional objects classified as objects. In some instances, operation 422 may additionally or alternatively comprise determining one or more predicted positions of at least the closest object based at least in part on a velocity associated with the object. Operation 422 may additionally or alternatively include determining the closest object based at least in part on current and/or predicted positions of one or more objects and determining which object is or is predicted to be closest to the position 408 of the autonomous vehicle.

At operation 424, example process 400 may comprise determining whether a closest object is at a position or is predicted to be at a position that meets or exceeds a threshold distance to the trajectory and/or to the vehicle, according to any of the techniques discussed herein. Operation 424 may comprise the threshold distance based at least in part on the trajectory. For example, the threshold distance may correspond with a maximum stopping distance of the vehicle and may include an additional safety margin in addition to the maximum stopping distance in some instances. In some examples, the threshold distance may be a distance along a line or curve associated with the trajectory. Operation 424 may comprise determining whether an object is or will be within less than the threshold distance of the vehicle (or a predicted position of the vehicle).

If an object is and/or is predicted to be at a position that is less than the threshold distance of the autonomous vehicle, operation 424 may comprise causing the vehicle to execute a contingent trajectory and/or re-determine a trajectory, according to any of the techniques discussed herein. For example, causing the vehicle to execute a contingent trajectory may comprise transmitting instructions to a system controller to cause the vehicle to slow down, execute a safe-stop maneuver, hard-brake, and/or the like. In some examples, the planner may determine the contingent trajectory and transmit the contingent trajectory to the trajectory verification component with the trajectory and/or upon request by the trajectory verification component. In an additional or alternate example, if an object is and/or is predicted to be at a position that is less than the threshold distance of the autonomous vehicle, operation 424 may comprise transmitting a request to the planner to determine a new trajectory.

If no object is and/or is predicted to be within the threshold distance of the autonomous vehicle, operation 424 may validate the trajectory. Additionally or alternatively, in such an instance, operation 424 may conduct an additional check, which may include determining whether a furthest ground data point is at a distance that meets or exceeds the threshold distance (this may be the same or a different threshold distance than the distance from the object), according to any of the techniques discussed herein. The furthest ground data point may be a sensor data point classified as being ground that is at a furthest, or one of the furthest, ground data points from the position (or predicted position) of the autonomous vehicle. This may functionally be a check to ensure that there is sensor data far enough from the autonomous vehicle to ensure that the autonomous vehicle could stop before hitting any objects and has detected any objects within the autonomous vehicle's stopping distance, plus some margin in some instances.

If operation 424 includes validating the trajectory, the trajectory may be passed to the controller(s) of the autonomous vehicle causing the autonomous vehicle to execute the trajectory (e.g., by transmitting the trajectory to system controller(s)).

Figure 5:
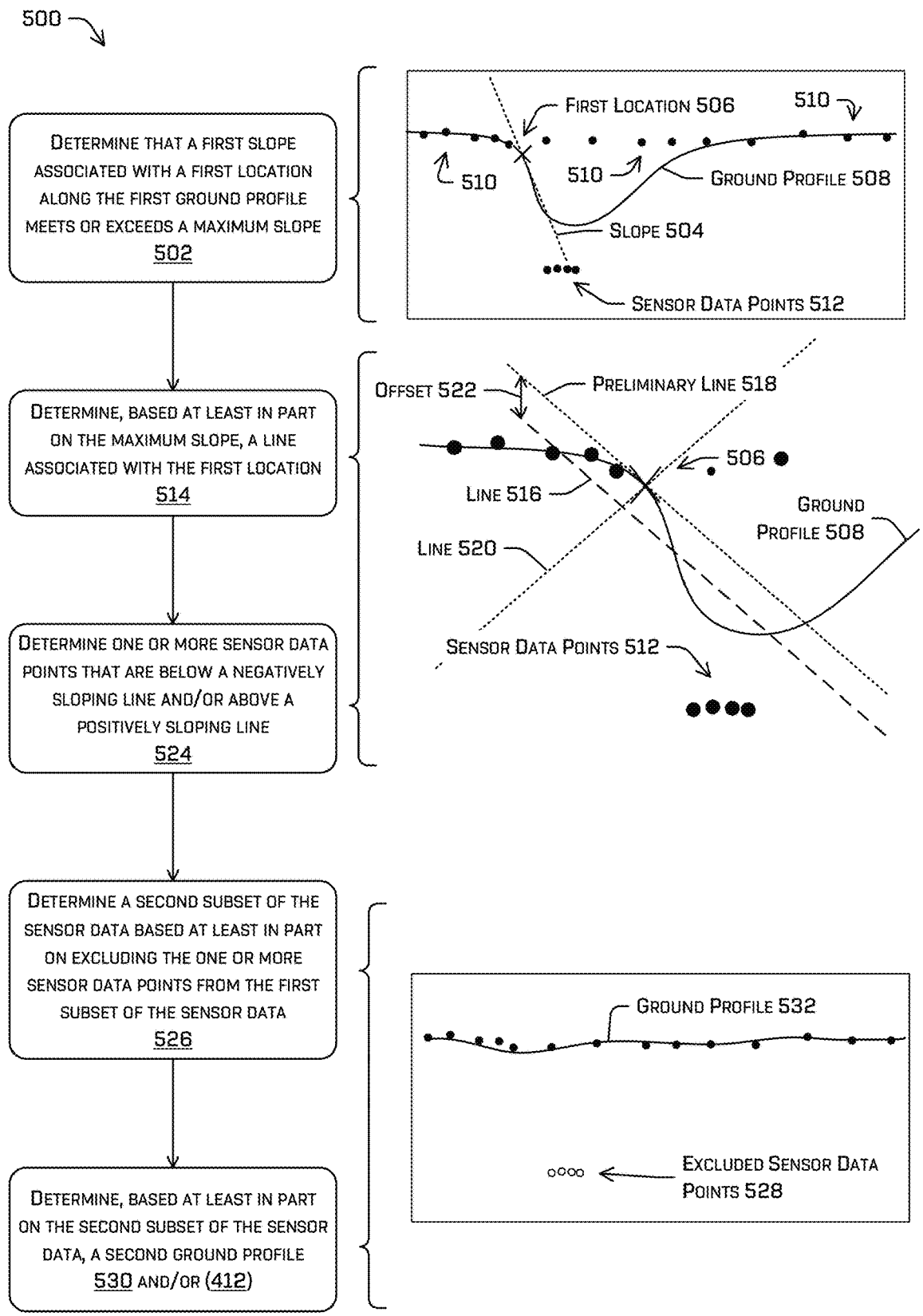
FIG. 5 illustrates a pictorial flow diagram of an example process for correcting an inaccurate ground profile, in particular an example process for excluding sensor data point(s) that are contributing to the inaccurate ground profile.

FIG. 5 illustrates a pictorial flow diagram of an example process 500 for correcting an inaccurate ground profile, in particular by excluding sensor data point(s) that are contributing to the inaccurate ground profile. Example process 500 may receive a first subset of sensor data and a first ground profile and may determine to exclude one or more sensor data points thereof, resulting in a second subset of sensor data that may be used to determine a new ground profile. In some examples, example process 500 may stand-alone or, in other examples, example process 500 may be part of example process 400.

At operation 502, example process 500 may comprise determining that a first slope 504 associated with a location 506 along a first (estimated) ground profile 508 meets or exceeds a maximum slope, according to any of the techniques discussed herein. For example, determining the slope may be part of determining the ground profile 508 or, an additional or alternate example, determining the slope may include determining a slope at regularly intervals along the ground profile, starting at or near a location of the vehicle. FIG. 5 depicts the slope 504 as a dashed line, the location as an "x," the ground profile 508 as a solid line, and sensor data as filled-in dots. The sensor data includes valid sensor data points 510 and inaccurate sensor data points 512. The vehicle does not need an indication that sensor data points 512 are inaccurate to successfully exclude these points. The technique described herein results in excluding these points without such prior indication.

At operation 514, example process 500 may comprise determining, based at least in part on the maximum slope, a line 516 associated with the location 506, according to any of the techniques discussed herein. Determining the line may comprise determining a line 518 having a slope equal to the maximum slope. In some examples, operation 514 may include determining two such lines-one with a negative maximum slope, e.g., line 518, and one with a positive maximum slope, e.g., line 520. In some examples, either line may originate at or pass through the location 506 and may be considered a preliminary line in examples where a vertical offset is further applied to the line(s). In some examples, the final line, e.g., line 516, may be determined by applying a negative vertical offset, such as offset 522, to a negatively sloped line, such as line 516; and/or applying a positive vertical offset to a positively sloped line, such as line 520. Note that no positive offset and resultant line are depicted in FIG. 5 for the sake of clarity. The offset may be applied to the line to avoid excluding valid sensor data points that are close to the location 506. Note that a positively-sloped line may prevent trees from being treated as being part of the ground when the ground profile has a positive slope that meets or exceeds the maximum slope.

At operation 524, example process 500 may comprise determining one or more sensor data points are below a negatively sloping line and/or above a positively sloping line, according to any of the techniques discussed herein. For example, operation 524 may include determining a sensor data point having an elevation less than elevations defined by a negatively-sloped line and/or a sensor data point having an elevation greater than elevations defined by a positively-sloped line. In the depicted example, this may result in identifying sensor data points 512 since they are below line 516 (i.e., the line being negatively vertically offset from the line having the maximum slope passing through the location).

In some examples, determining the sensor data points on an opposite side of a line may be limited to sensor data points that are longitudinally beyond the location 506 from the vehicle, where longitude is referenced along the trajectory. In other words, those points that have a displacement along the trajectory greater than a displacement along the trajectory associated with the location 506. For example, this may be the sensor data points lying to the right of the location 506 in the illustration.

At operation 526, example process 500 may comprise determining a second subset of the sensor data based at least in part on excluding the one or more sensor data points (determined at operation 524) from the first subset of the sensor data, according to any of the techniques discussed herein. Excluding the one or more sensor data points 528 from the first subset may include masking, deleting, or down-weighting such sensor data points. Down-weighting such sensor data points may include down-weighting the excluded sensor data points 528 during the ground profile generation at operation 530/operation 412.

At operation 530, example process 500 may return to operation 412, which may comprise determining, based at least in part on the second subset of the sensor data, a second (new) ground profile 532, according to any of the techniques discussed herein. The resultant portion of the ground profile 532 near the excluded sensor data points 528 may no longer have a slope that meets or exceeds the maximum slope, thereby correcting the ground profile and decreases false positive and/or false negative detections of objects in an environment associated with the vehicle.

Example System

Figure 6:
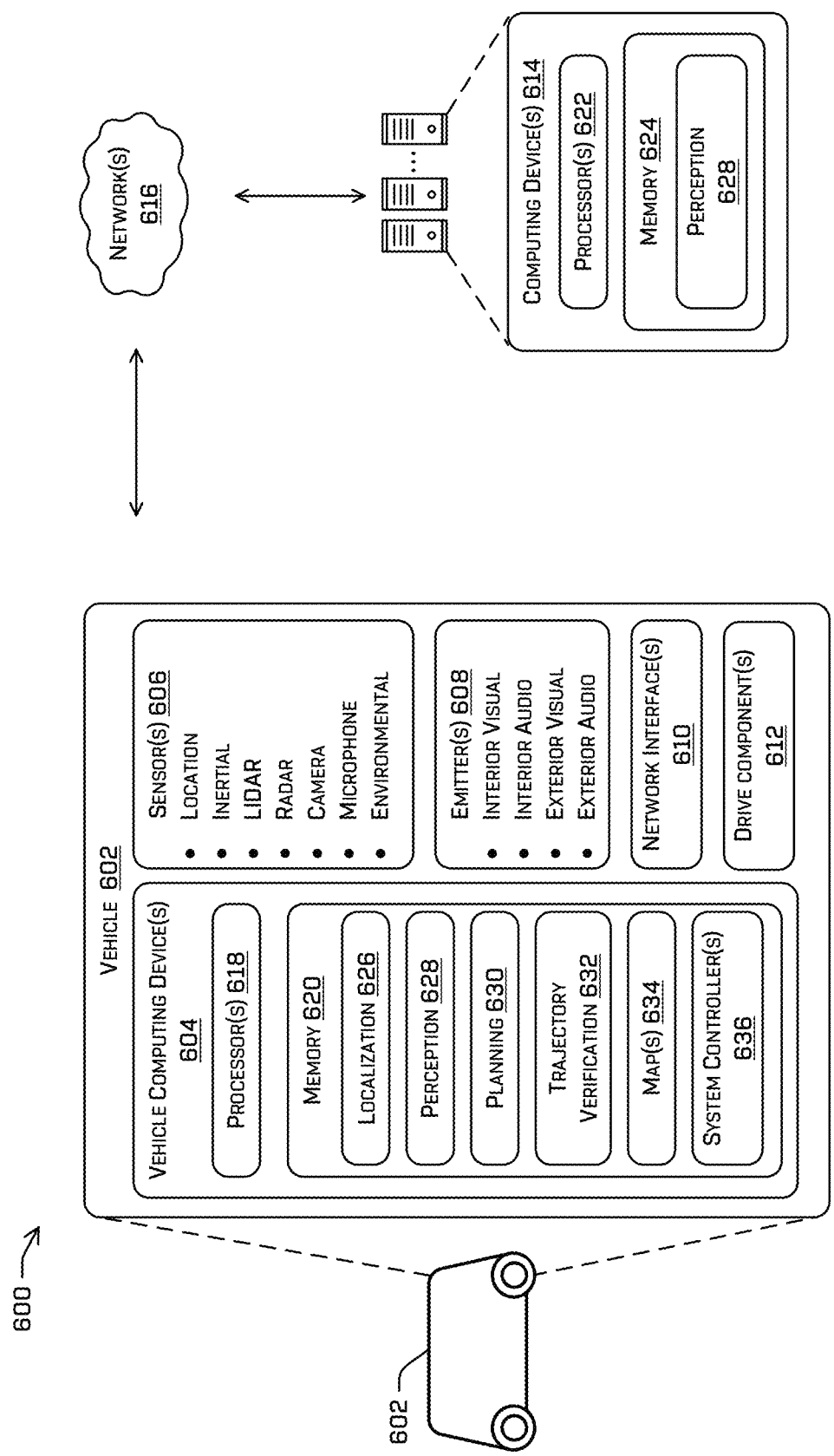
FIG. 6 illustrates a block diagram of an example system comprising a perception component that may correct a ground profile when inaccurate sensor data has been received.

FIG. 6 illustrates a block diagram of an example system 600 that implements the techniques discussed herein. In some instances, the example system 600 may include a vehicle 602, which may represent the vehicle 102 in FIG. 1. In some instances, the vehicle 602 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 602 may be a fully or partially autonomous vehicle having any other level or classification. Moreover, in some instances, the techniques described herein may be usable by non-autonomous vehicles as well.

The vehicle 602 may include a vehicle computing device(s) 604, sensor(s) 606, emitter(s) 608, network interface(s) 610, and/or drive component(s) 612. Vehicle computing device(s) 604 may represent computing device(s) 106 and sensor(s) 606 may represent sensor(s) 104. The system 600 may additionally or alternatively comprise computing device(s) 614.

In some instances, the sensor(s) 606 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 606 may include multiple instances of each of these or other types of sensors. For instance, the radar sensors may include individual radar sensors located at the corners, front, back, sides, and/or top of the vehicle 602. As another example, the cameras may include multiple cameras disposed at various locations about the exterior and/or interior of the vehicle 602. The sensor(s) 606 may provide input to the vehicle computing device(s) 604 and/or to computing device(s) 614.

The vehicle 602 may also include emitter(s) 608 for emitting light and/or sound, as described above. The emitter(s) 608 in this example may include interior audio and visual emitter(s) to communicate with passengers of the vehicle 602. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 608 in this example may also include exterior emitter(s). By way of example and not limitation, the exterior emitter(s) in this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 602 may also include network interface(s) 610 that enable communication between the vehicle 602 and one or more other local or remote computing device(s). For instance, the network interface(s) 610 may facilitate communication with other local computing device(s) on the vehicle 602 and/or the drive component(s) 612. Also, the network interface(s) 610 may additionally or alternatively allow the vehicle to communicate with other nearby computing device(s) (e.g., other nearby vehicles, traffic signals, etc.). The network interface(s) 610 may additionally or alternatively enable the vehicle 602 to communicate with computing device(s) 614. In some examples, computing device(s) 614 may comprise one or more nodes of a distributed computing system (e.g., a cloud computing architecture).

The network interface(s) 610 may include physical and/or logical interfaces for connecting the vehicle computing device(s) 604 to another computing device or a network, such as network(s) 616. For example, the network interface(s) 610 may enable Wi-Fi-based communication such as via frequencies defined by the IEEE 600.11 standards, short range wireless frequencies such as Bluetooth®, cellular communication (e.g., 2G, 6G, 4G, 4G LTE, 5G, etc.) or any suitable wired or wireless communications protocol that enables the respective computing device to interface with the other computing device(s). In some instances, the vehicle computing device(s) 604 and/or the sensor(s) 606 may send sensor data, via the network(s) 616, to the computing device(s) 614 at a particular frequency, after a lapse of a predetermined period of time, in near real-time, etc.

In some instances, the vehicle 602 may include one or more drive components 612. In some instances, the vehicle 602 may have a single drive component 612. In some instances, the drive component(s) 612 may include one or more sensors to detect conditions of the drive component(s) 612 and/or the surroundings of the vehicle 602. By way of example and not limitation, the sensor(s) of the drive component(s) 612 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 612. In some cases, the sensor(s) on the drive component(s) 612 may overlap or supplement corresponding systems of the vehicle 602 (e.g., sensor(s) 606).

The drive component(s) 612 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 612 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 612. Furthermore, the drive component(s) 612 may also include one or more communication connection(s) that enable communication by the respective drive component with one or more other local or remote computing device(s).

The vehicle computing device(s) 604 may include processor(s) 618 and memory 620 communicatively coupled with the one or more processors 618. Memory 620 may represent memory 108. Computing device(s) 614 may also include processor(s) 622, and/or memory 624. The processor(s) 618 and/or 622 may be any suitable processor capable of executing instructions to process data and perform operations as described herein. By way of example and not limitation, the processor(s) 618 and/or 622 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 620 and/or 624 may be examples of non-transitory computer-readable media. The memory 620 and/or 624 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 620 and/or memory 624 may store a localization component 626, perception component 628, planning component 630, trajectory verification component 632, map(s) 634, and/or system controller(s) 636. Perception component 628 may represent perception component 110, planning component 630 may represent planning component 112, and/or trajectory verification component 632 may represent trajectory verification component 114.

In at least one example, the localization component 626 may include hardware and/or software to receive data from the sensor(s) 606 to determine a position, velocity, and/or orientation of the vehicle 602 (e.g., one or more of an x-, y-, z-position, roll, pitch, or yaw). For example, the localization component 626 may include and/or request/receive map(s) 634 of an environment and can continuously determine a location, velocity, and/or orientation of the autonomous vehicle within the map(s) 634. In some instances, the localization component 626 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 626 may provide data to various components of the vehicle 602 to determine an initial position of an autonomous vehicle for generating a trajectory and/or for generating map data, as discussed herein. In some examples, localization component 626 may provide, to the trajectory verification component 632, a location and/or orientation of the vehicle 602 relative to the environment and/or sensor data associated therewith.

In some instances, perception component 628 may comprise a primary perception system and/or a prediction system implemented in hardware and/or software. The perception component 628 may detect object(s) in in an environment surrounding the vehicle 602 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 628 is referred to as perception data.

The planning component 630 may receive a location and/or orientation of the vehicle 602 from the localization component 626 and/or perception data from the perception component 628 and may determine instructions for controlling operation of the vehicle 602 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 636 and/or drive component(s) 612 may parse/cause to be carried out, second instructions for the emitter(s) 608 may be formatted according to a second format associated therewith).

The trajectory verification component 632 may operate on the vehicle 602 and/or on the computing device(s) 614. In some examples, the trajectory verification component 632 may be downstream (receive an output) from the planning component 630 in a pipeline. The trajectory verification component 632 may be configured to pass all, part, or none of the output of the planning component 630, depending on the determinations discussed herein, to system controller(s) 636 for implementation. In some examples, the trajectory verification component 632 may comprise a feedback loop for providing input to the planning component 630, such as a flag or message that triggers re-determination of a trajectory.

The memory 620 and/or 624 may additionally or alternatively store a mapping system (e.g., generating a map based at least in part on sensor data), a planning system, a ride management system, etc. Although localization component 626, perception component 628, planning component 630, map(s) 634, and/or system controller(s) 636 are illustrated as being stored in memory 620, any of these components may include processor-executable instructions, machine-learned model(s) (e.g., a neural network), and/or hardware and all or part of any of these components may be stored on memory 624 or configured as part of computing device(s) 614.

As described herein, the localization component 626, the perception component 628, the planning component 630, and/or other components of the system 600 may comprise one or more ML models. For example, the localization component 626, the perception component 628, and/or the planning component 630 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 6 (ID6), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, EfficientNet, PointNet, Xception, and the like or visual transformers (ViTs), such as ConvNeXt.

Memory 620 may additionally or alternatively store one or more system controller(s) 636, which may be configured to control steering, propulsion, braking, safety, emitters, communication, and other systems of the vehicle 602. These system controller(s) 636 may communicate with and/or control corresponding systems of the drive component(s) 612 and/or other components of the vehicle 602. For example, the planning component 630 may generate instructions based at least in part on perception data generated by the perception component 628, which the trajectory verification component 632 may validate and/or transmit to the system controller(s) 636. The system controller(s) 636 may control operation of the vehicle 602 based at least in part on the instructions received from the planning component 630 and/or trajectory verification component 632. In some examples, the trajectory verification component 632 may replace instructions generated by the planning component 630 with alternate instructions associated with a contingent trajectory such as, for example, a contingent trajectory that may specify an alternate maneuver, and/or the like.

It should be noted that while FIG. 6 is illustrated as a distributed system, in alternative examples, components of the vehicle 602 may be associated with the computing device(s) 614 and/or components of the computing device(s) 614 may be associated with the vehicle 602. That is, the vehicle 602 may perform one or more of the functions associated with the computing device(s) 614, and vice versa.

Example Clauses

A: A method comprising: receiving sensor data from a sensor associated with an autonomous vehicle; receiving a set of waypoints from a first system of the autonomous vehicle through which the autonomous vehicle is to travel; determining, by a second system of the autonomous vehicle and based at least in part on a first subset of the sensor data associated with the set of waypoints, a first ground profile; determining that a first slope associated with a first location along the first ground profile meets or exceeds a maximum slope; determining, based at least in part on the maximum slope, a line associated with the first location; determining a sensor data point that, when connected with the first location, defines a line having a slope exceeding the maximum slope; determining a second subset of the sensor data based at least in part on excluding the sensor data point from the first subset of the sensor data; determining, by the second system and based at least in part on the second subset of the sensor data, a second ground profile; and determining, by the second system and based at least in part on the second ground profile, a validity of the set of waypoints.

B: The method of paragraph A, wherein: determining the validity of the set of waypoints comprises detecting an object based at least in part on the second ground profile; and the method further comprises controlling the autonomous vehicle based at least in part on the detected object.

C: The method of either paragraph A or B, wherein determining the line further comprises: determining, based at least in part on the maximum slope, a preliminary line having the maximum slope associated with the first location; and shifting the preliminary line vertically to define the line.

D: The method of any one of paragraphs A-C, wherein: determining the line further comprises determining a first line and a second line; and the first line is positively sloped and the second line is negative sloped.

E: The method of any one of paragraphs A-D, wherein excluding the sensor data point comprises down-weighting or masking the sensor data point for generating the second ground profile.

F: A system comprising: one or more processors; and a memory storing processor-executable instructions that, when executed by the one or more processors, cause the system to perform operations comprising: receiving sensor data from a sensor associated with an vehicle; determining, based at least in part on a the sensor data, a first ground profile; determining that a first slope associated with a first location along the first ground profile meets or exceeds a maximum slope; determining, based at least in part on the maximum slope, a line associated with the first location; determining a sensor data point that, when connected with the first location, defines a line having a slope exceeding the maximum slope; determining a subset of the sensor data based at least in part on excluding the sensor data point from the first subset of the sensor data; determining, based at least in part on the subset of the sensor data, a second ground profile; and determining, based at least in part on the second ground profile, a validity of the set of waypoints.

G: The system of paragraph F, wherein: the operations further comprise receiving a set of waypoints from a first system of the vehicle; a second system determines the first ground profile and the second ground profile based at least in part on the set of waypoints; and the second system determines the validity of the set of waypoints.

H: The system of either paragraph F or G, wherein: determining the validity of the set of waypoints comprises detecting an object based at least in part on the second ground profile; and the method further comprises controlling the autonomous vehicle based at least in part on the detected object.

I: The system of any one of paragraphs F-H, further comprising: detecting an object based at least in part on the second ground profile; and controlling the vehicle based at least in part on the detected object.

J: The system of any one of paragraphs F-I, wherein determining the line further comprises: determining, based at least in part on the maximum slope, a preliminary line having the maximum slope associated with the first location; and shifting the preliminary line vertically to define the line.

K: The system of any one of paragraphs F-J, wherein: determining the line further comprises determining a first line and a second line; and the first line is positively sloped and the second line is negative sloped.

L: The system of any one of paragraphs F-K, wherein excluding the sensor data point comprises down-weighting or masking the sensor data point for generating the second ground profile.

M: The system of any one of paragraphs F-L, wherein the subset of sensor data points is a first subset of data points and wherein the operations further comprise determining a corridor associated with the set of waypoints, wherein the first ground profile and the second ground profile are further based at least in part on a second subset of sensor data points within a width of the set of waypoints.

N: The system of any one of paragraphs F-M, wherein determining the first ground profile further comprises one of: determining a previous path associated with a previous operation of the autonomous vehicle, determining a position of an axle of the autonomous vehicle, or determining a nearest location to the autonomous vehicle along the path that is associated with a slope that is less than or equal to a maximum slope.

O: A non-transitory computer-readable medium storing processor-executable instructions that, when executed by one or more processors, cause the one or more processors to perform operations comprising: receiving sensor data from a sensor associated with an vehicle; determining, based at least in part on a the sensor data, a first ground profile; determining that a first slope associated with a first location along the first ground profile meets or exceeds a maximum slope; determining, based at least in part on the maximum slope, a line associated with the first location; determining a sensor data point that, when connected with the first location, defines a line having a slope exceeding the maximum slope; determining a subset of the sensor data based at least in part on excluding the sensor data point from the first subset of the sensor data; determining, based at least in part on the subset of the sensor data, a second ground profile; and determining, based at least in part on the second ground profile, a validity of the set of waypoints.

P: The non-transitory computer-readable medium of paragraph O, wherein: the operations further comprise receiving a set of waypoints from a first system of the vehicle; a second system determines the first ground profile and the second ground profile based at least in part on the set of waypoints; and the second system determines the validity of the set of waypoints.

Q: The non-transitory computer-readable medium of either paragraph O or P, wherein: determining the validity of the set of waypoints comprises detecting an object based at least in part on the second ground profile; and the method further comprises controlling the autonomous vehicle based at least in part on the detected object.

R: The non-transitory computer-readable medium of any one of paragraphs O-Q, further comprising: detecting an object based at least in part on the second ground profile; and controlling the vehicle based at least in part on the detected object.

S: The non-transitory computer-readable medium of any one of paragraphs O-R, wherein: determining the line further comprises determining a first line and a second line; and the first line is positively sloped and the second line is negative sloped.

T: The non-transitory computer-readable medium of any one of paragraphs O-S, wherein determining the first ground profile further comprises one of: determining a previous path associated with a previous operation of the autonomous vehicle, determining a position of an axle of the autonomous vehicle, or determining a nearest location to the autonomous vehicle along the path that is associated with a slope that is less than or equal to a maximum slope.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
    receiving sensor data from a sensor associated with an autonomous vehicle;
    receiving a set of waypoints from a first system of the autonomous vehicle through which the autonomous vehicle is to travel;
    determining, by a second system of the autonomous vehicle and based at least in part on a first subset of the sensor data associated with the set of waypoints, a first ground profile;
    determining that a first slope associated with a first location along the first ground profile meets or exceeds a maximum slope;

determining, based at least in part on the maximum slope, a line associated with the first location;

determining a sensor data point that, when connected with the first location, defines a line having a slope exceeding the maximum slope;

determining a second subset of the sensor data based at least in part on excluding the sensor data point from the first subset of the sensor data;

determining, by the second system and based at least in part on the second subset of the sensor data, a second ground profile;

determining, by the second system and based at least in part on the second ground profile, a validity of the set of waypoints; and controlling the vehicle based on the validity of the set of waypoints.

2. The method of claim 1, wherein:

determining the validity of the set of waypoints comprises detecting an object based at least in part on the second ground profile; and the method further comprises controlling the autonomous vehicle based at least in part on the detected object.

3. The method of claim 1, wherein determining the line further comprises:

determining, based at least in part on the maximum slope, a preliminary line having the maximum slope associated with the first location; and shifting the preliminary line vertically to define the line.

4. The method of claim 1, wherein:

determining the line further comprises determining a first line and a second line; and the first line is positively sloped and the second line is negative sloped.

5. The method of claim 1, wherein excluding the sensor data point comprises down-weighting or masking the sensor data point for generating the second ground profile.

6. A system comprising:

one or more processors; and a memory storing processor-executable instructions that, when executed by the one or more processors, cause the system to perform operations comprising:

receiving sensor data from a sensor associated with a vehicle;

determining, based at least in part on the sensor data, a first ground profile;

determining that a first slope associated with a first location along the first ground profile meets or exceeds a maximum slope;

determining, based at least in part on the maximum slope, a line associated with the first location;

determining a sensor data point that, when connected with the first location, defines a line having a slope exceeding the maximum slope;

determining a subset of the sensor data based at least in part on excluding the sensor data point from the sensor data;

determining, based at least in part on the subset of the sensor data, a second ground profile;

determining, based at least in part on the second ground profile, a validity of a set of waypoints; and controlling the vehicle based on the validity of the set of waypoints.

7. The system of claim 6, wherein:

the operations further comprise receiving the set of waypoints from a first system of the vehicle;

a second system determines the first ground profile and the second ground profile based at least in part on the set of waypoints; and the second system determines the validity of the set of waypoints.

8. The system of claim 6, wherein:

determining the validity of the set of waypoints comprises detecting an object based at least in part on the second ground profile; and the operations further comprise controlling the vehicle based at least in part on the detected object.

9. The system of claim 6, further comprising:

detecting an object based at least in part on the second ground profile; and controlling the vehicle based at least in part on the detected object.

10. The system of claim 6, wherein determining the line further comprises:

determining, based at least in part on the maximum slope, a preliminary line having the maximum slope associated with the first location; and shifting the preliminary line vertically to define the line.

11. The system of claim 6, wherein:

determining the line further comprises determining a first line and a second line; and the first line is positively sloped and the second line is negative sloped.

12. The system of claim 6, wherein excluding the sensor data point comprises down-weighting or masking the sensor data point for generating the second ground profile.

13. The system of claim 6, wherein the subset of sensor data points is a first subset of data points and wherein the operations further comprise determining a corridor associated with the set of waypoints, wherein the first ground profile and the second ground profile are further based at least in part on a second subset of sensor data points within a width of the set of waypoints.

14. The system of claim 6, wherein determining the first ground profile further comprises one of:

determining a previous path associated with a previous operation of the vehicle, determining a position of an axle of the vehicle, or determining a nearest location to the vehicle along the previous path that is associated with a slope that is less than or equal to a maximum slope.

15. A non-transitory computer-readable medium storing processor-executable instructions that, when executed by one or more processors, cause the one or more processors to perform operations comprising:

receiving sensor data from a sensor associated with an vehicle;

determining, based at least in part on a the sensor data, a first ground profile;

determining that a first slope associated with a first location along the first ground profile meets or exceeds a maximum slope;

determining, based at least in part on the maximum slope, a line associated with the first location;

determining a sensor data point that, when connected with the first location, defines a line having a slope exceeding the maximum slope;

determining a subset of the sensor data based at least in part on excluding the sensor data point from the sensor data;

determining, based at least in part on the subset of the sensor data, a second ground profile;

determining, based at least in part on the second ground profile, a validity of a set of waypoints; and controlling the vehicle based on the validity of the set of waypoints.

16. The non-transitory computer-readable medium of claim 15, wherein:

the operations further comprise receiving the set of waypoints from a first system of the vehicle;

a second system determines the first ground profile and the second ground profile based at least in part on the set of waypoints; and the second system determines the validity of the set of waypoints.

17. The non-transitory computer-readable medium of claim 15, wherein:

determining the validity of the set of waypoints comprises detecting an object based at least in part on the second ground profile; and the operations further comprise further comprises controlling the vehicle based at least in part on the detected object.

18. The non-transitory computer-readable medium of claim 15, further comprising:

detecting an object based at least in part on the second ground profile; and controlling the vehicle based at least in part on the detected object.

19. The non-transitory computer-readable medium of claim 15, wherein:

determining the line further comprises determining a first line and a second line; and the first line is positively sloped and the second line is negative sloped.

20. The non-transitory computer-readable medium of claim 15, wherein determining the first ground profile further comprises one of:

determining a previous path associated with a previous operation of the vehicle, determining a position of an axle of the vehicle, or determining a nearest location to the vehicle along the previous path that is associated with a slope that is less than or equal to a maximum slope.

* * * * *